United States Patent [19]

Oh et al.

[11] Patent Number: 5,004,573

[45] Date of Patent: Apr. 2, 1991

[54] FABRICATION METHOD FOR HIGH VOLTAGE ZINC OXIDE VARISTOR

[75] Inventors: Myung H. Oh; Kyung J. Lee; In J. Chung; Nam Y. Lee; Myung S. Kim, all of Seoul, Rep. of Korea

[73] Assignee: Korea Institute of Science and Technology, Rep. of Korea

[21] Appl. No.: 430,463

[22] Filed: Nov. 2, 1989

[51] Int. Cl.$^5$ ............................................. C04B 41/81
[52] U.S. Cl. ......................................... 264/61; 264/62
[58] Field of Search ................... 252/518; 264/61, 62, 264/66; 338/20, 21; 427/101, 102, 126.2, 419.2

[56] References Cited

U.S. PATENT DOCUMENTS 3,723,175  3/1973  Masuyama et al. ............. 252/518 X

OTHER PUBLICATIONS

Michio Matsuoka, "Nonohmic Properties of Zinc Oxide Ceramics", Japanese Journal of Applied Physics, vol. 10, No. 6, Jun. 1971, pp. 736-746.

Primary Examiner—James Lowe
Assistant Examiner—Christopher A. Fiorilla
Attorney, Agent, or Firm—Lowe, Price, LeBlanc, Becker & Shur

[57] ABSTRACT

A method of producing a zinc oxide varistor for high voltage which is a voltage-current non-linear type of resistor including zinc oxide as the major ingredient and bismuth oxide or manganese dioxide as additives for use with a circuit protector and gapless arrester. The method of the invention includes sintering a zinc oxide composition lacking bismuth oxide at 1200°-1350° C. under conditions and for a period of time effective to form a primary sintered body, heat-treating a primary sintered body coated with an amount of metal oxide paste containing mostly bismuth oxide at a temperature of 1000°-1200° C. for a period of time effective to diffuse the metal oxide paste to the grain boundaries of the zinc oxide grains.

9 Claims, 2 Drawing Sheets

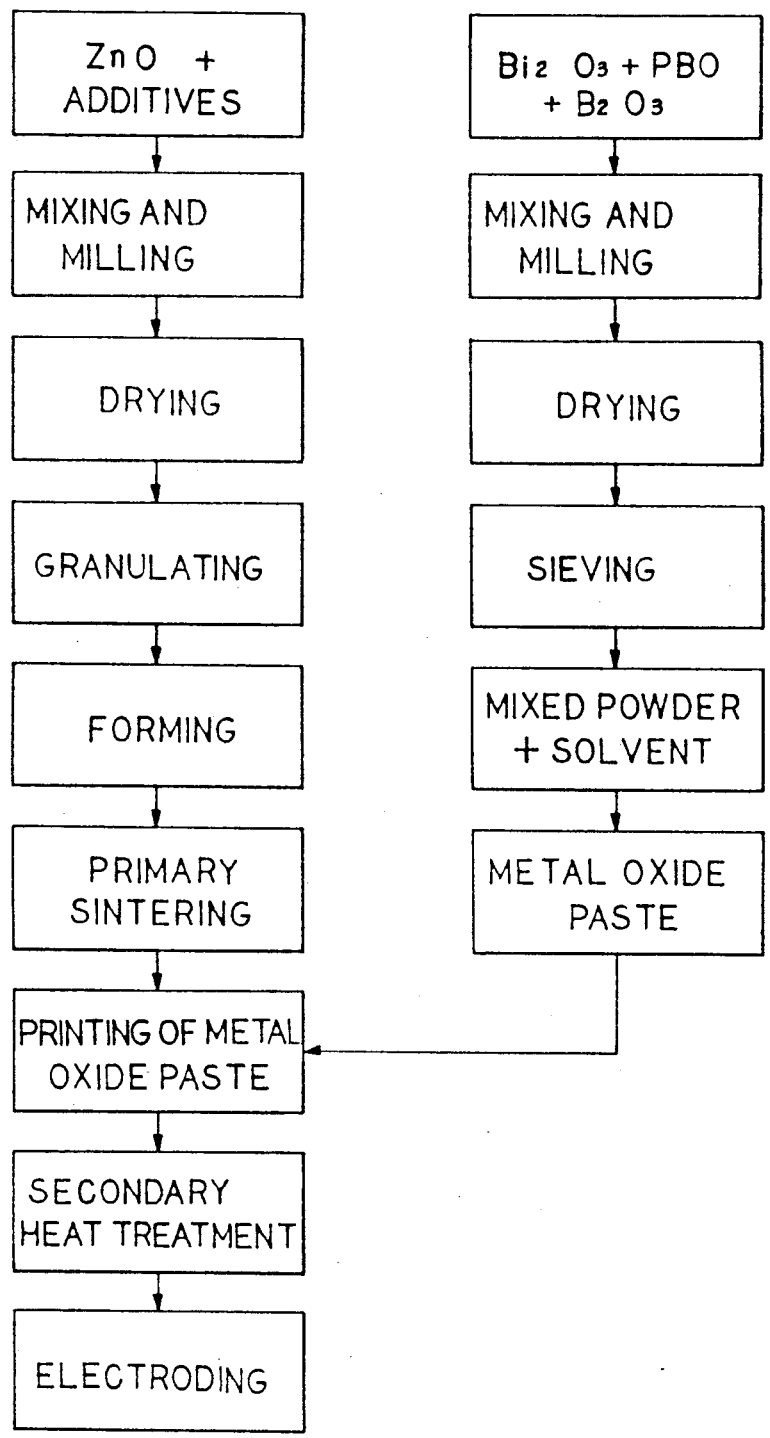
FIG·1

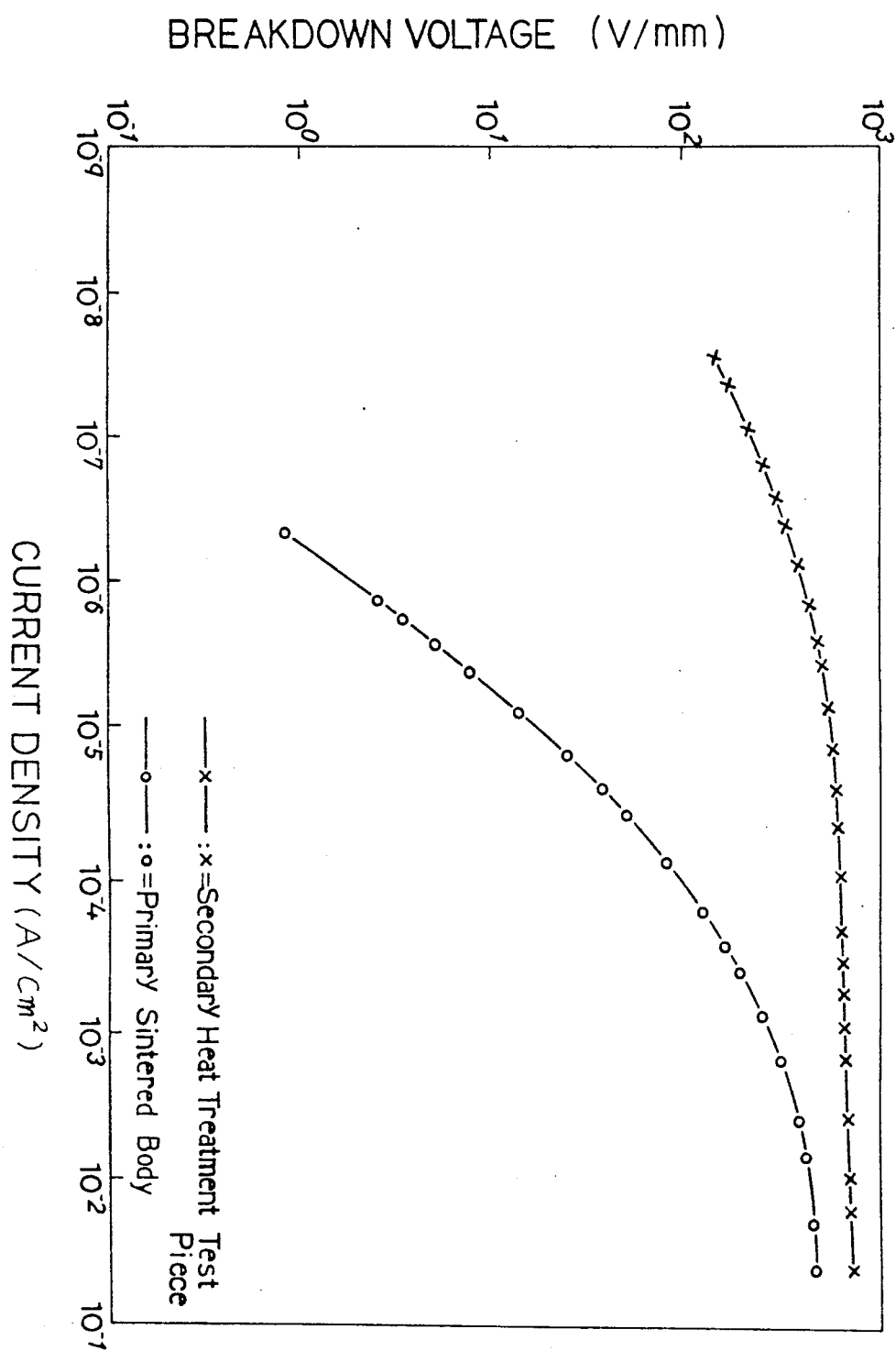
FIG·2

FABRICATION METHOD FOR HIGH VOLTAGE ZINC OXIDE VARISTOR

BACKGROUND OF THE INVENTION

The present invention relates to a method for fabricating a zinc oxide varistor for high voltage which exhibits a high breakdown voltage while at the same time having a good voltage-current characteristics by preventing the grain from becoming coarse according to liquid phase sintering methods used to fabricate a sintered body.

A zinc oxide varistor is a resistor having a non-linear voltage-current relationship. A zinc oxide varistor is a sintered body having zinc oxide as its major ingredient and containing bismuth oxide and manganese dioxide as additives. Such varistor is widely used as protecting elements of various kinds to protect electric and electronic instruments from lighting and switching surges. Varistors are also used as gapless type arrester elements for protecting the electric power system from falling of thunderbolt based upon their non-linear voltage-current characteristics and their excess voltage absorbing capacity.

The operating voltage of a zinc oxide varistor is determined in proportion to the number of potential barriers formed between both electrodes of the varistor.

Thus, the number of potential barriers per unit thickness becomes inversely proportional to the grain size, and the grain size becomes an important factor in determining the operating voltage.

According to a conventional method of fabricating a varistor (Jpn.: J. Appl. Phys. 10(6): 736-746 (1971), a varistor is fabricated by mixing very small amounts of bismuth oxide ($Bi_2O_3$), cobalt oxide ($Co_3O_4$), manganese dioxide ($MnO_2$), antimony oxide ($Sb_2O_3$), chromium oxide ($Cr_2O_3$), and the like, and then sintered at a temperature of 1200° C.–1350° C. The bismuth oxide is melted during the sintering process and causes liquid phase sintering. Therefore, the zinc oxide grains by this fabrication process grow over 10 um.

Under these conditions the fabrication of a varistor having a breakdown voltage (V 1mA/mm) of over 300 volts becomes difficult. In addition to the above, the non-linear voltage-current characteristics and the uniformity of the characteristics are reduced because of the volatilization of bismuth oxide and the abnormal grain growth by the melted bismuth oxide liquid phase that occurs during the process.

SUMMARY OF THE INVENTION

Therefore, it is an object of the present invention to provide a method of fabricating a zinc oxide varistor for high voltage which exhibits a high breakdown voltage and good voltage-current characteristics while preventing abnormal grain growth and the volatilization of bismuth oxide caused by liquid phase sintering.

The object of the present invention is accomplished by providing a primary sintered body having more homogeneous grain size distribution by a composition lacking bismuth oxide. A metal oxide paste comprising bismuth oxide is then printed on the primary sintered body and thereafter the bismuth oxide-printed body is subjected to a secondary heat treatment to diffuse the paste to the zinc oxide grain boundaries.

The foregoing and other objects as well as advantages of the present invention will become clear from the following description of the invention with reference to the accompanying drawings.

BRIEF DESCRIPTION OF THE DRAWINGS

FIG. 1 is process diagram for illustrating the fabrication process of a zinc oxide varistor according to the present invention.

FIG. 2 is a graph showing the voltage-current characteristics of a zinc oxide varistor that has not been subjected to any secondary heat treatment, and of a zinc oxide varistor fabricated according to the present invention.

DETAILED DESCRIPTION OF THE INVENTION

The method of fabricating a zinc oxide varistor for high voltage according to the present invention will be explained in detail with reference to the fabrication process diagram of FIG. 1 as follows.

A mixture of oxides is prepared comprising zinc oxide as the major ingredient, and very small amounts of antimony oxide, cobalt oxide, manganese oxide and chromium oxide, which are additives, in the absence of bismuth oxide. The oxides are added in a predetermined ratio, and are mixed, milled and then dried. The dried mixture is then formed with pressure into a disc of a predetermined thickness, and sintered at a temperature of 1200° C.–1350° C. to form a primary sintered body.

A series of process steps such as mixing, milling, drying and sieving are then carried out with a metal oxide comprising lead oxide, bismuth oxide and borax. A solvent is then mixed into the mixed powder, to thereby produce a metal oxide paste. This metal oxide paste is then printed on the whole of both surfaces of said primary sintered body, and a secondary heating process is conducted at a temperature of 1000° C.–1200° C., so that the metal oxide printed on the surface of the primary sintered body is diffused to the grain boundaries in the interior of the sintered body.

Finally, electrodes are attached to the front and rear disc surfaces of a sintered body which is then subjected to a secondary heat treatment.

The zinc oxide varistor for high voltage fabricated according to the method of the present invention exhibits good voltage-current characteristics. This is attained by either preventing any abnormal grain growth caused by liquid phase sintering during the fabrication process or by decreasing the volatilization of bismuth oxide, and by diffusing the bismuth oxide to the zinc oxide grain boundaries. Moreover, the thus obtained varistor exhibits a high breakdown voltage, 500-900 V/mm, which therefore makes it suitable as a high voltage varistor element.

The present invention will be explained more clearly through the following examples.

EXAMPLES

Example 1

All metal oxides, except for bismuth oxide, present in a composition of a zinc oxide varistor are weighed in a composition ratio (mole ratio) of 97.5 ZnO+1.0 $Sb_2O_3$+0.5 $Co_3O_4$+0.5 $MnO_2$+0.5 $Cr_2O_3$. The oxides are then mixed and ground in a ball mill, and formed with pressure into a disc of 10 mm diameter and 1.2 mm thickness by using polyvinylalcohol as a binder and sintered at a temperature of 1200–1350° C. for one hour to thereby produce a primary sintered body.

Lead oxide, bismuth oxide, and borax are separately mixed in a weight ratio of 45:45:10 and formed into a metal oxide paste. The mixed powder is then mixed with a butylcarbitol solution containing 5.0 wt. % cellulose so as to have a viscosity of about 400 poise.

The thus manufactured metal oxide paste is printed on the two entire surfaces of the primary sintered body by silk screen printing. This is carried out by a secondary heat treatment at a temperature of 1000° C. for two hours. The metal oxide material is thus diffused to the grain boundaries in the interior of the sintered body. Silver electrodes (element area ratio 80%) are then bonded with fire to both opposite peripheral surfaces of the element to thereby fabricate the element.

The electrical characteristics of the element fabricated by this method are shown in Table 1 below.

TABLE 1

| Primary Sintering temperature (°C.) | Secondary heating temperature and time (°C. × hr.) | V lmA/mm (V) | Leakage current (μA) | $\alpha_1$ ($10^{-6}$-$10^{-4}$ A) | $\alpha_2$ ($10^{-4}$-$10^{-2}$ A) | Cap. (pF) |
|---|---|---|---|---|---|---|
| 1200 | 1000 × 2 | 697 | 0.50 | 13.3 | 41.1 | 160 |
| 1250 | 1000 × 2 | 641 | 0.65 | 11.3 | 44.8 | 175 |
| 1300 | 1000 × 2 | 668 | 0.42 | 11.1 | 47.2 | 180 |
| 1350 | 1000 × 2 | 510 | 1.4 | 9.5 | 34.9 | 220 |

Example 2

All steps of the process for fabricating the element are the same as in Example 1 except that the metal oxide paste composition comprised bismuth oxide and zinc oxide and the compositing was carried out at near (weight ratio: 98.5:1.5) the eutectic point (750° C.) in order to lower the melting temperature of the paste as far as possible.

The electrical characteristics of the element fabricated by this method are shown in Table 2 below.

TABLE 2

| Primary sintering temperature (°C.) | Secondary heating temperature and time (°C. × hr.) | V lmA/mm (V) | Leakage current (μA) | $\alpha_1$ ($10^{-6}$-$10^{-4}$ A) | $\alpha_2$ ($10^{-4}$-$10^{-2}$ A) | Cap. (pF) |
|---|---|---|---|---|---|---|
| 1200 | 1000 × 2 | 755 | 0.28 | 18.9 | 41.6 | 150 |
| 1250 | 1000 × 2 | 757 | 0.32 | 15.4 | 45.2 | 160 |
| 1300 | 1000 × 2 | 687 | 0.25 | 17.8 | 47.7 | 175 |
| 1350 | 1000 × 2 | 600 | 0.60 | 12.5 | 45.0 | 190 |

Example 3

All steps in the process for fabricating the element are the same as in Example 1 except that the metal oxide paste comprises bismuth oxide and $B_2O_3$ and that the paste was composed at a 96:4 weight ratio near the eutectic point (622° C.) in order to lower the melting temperature of the paste as far as possible.

The electrical characteristics of the element fabricated by this method are shown in Table 3 below.

TABLE 3

| Primary sintering temperature (°C.) | Secondary heating temperature and time (°C. × hr.) | V lmA/mm (V) | Leakage current (μA) | $\alpha_1$ ($10^{-6}$-$10^{-4}$ A) | $\alpha_2$ ($10^{-4}$-$10^{-2}$ A) | Cap. (pF) |
|---|---|---|---|---|---|---|
| 1200 | 1000 × 2 | 884 | 0.15 | 22.6 | 27.5 | 160 |
| 1250 | 1000 × 2 | 734 | 0.32 | 13.8 | 41.5 | 165 |
| 1300 | 1000 × 2 | 704 | 0.34 | 15.5 | 57.9 | 180 |
| 1350 | 1000 × 2 | 582 | 0.38 | 13.8 | 35.9 | 195 |

EXAMPLE 4

The primary sintering temperature is 1350° C., and the composition of the paste used for the secondary heating process is the same as in Example 1, except that the secondary heat treatment was carried out at 1000° C., 1100° C. and 1200° C. for one hour. The electrical characteristics of the element fabricated by this method are as shown in Table 4 below.

TABLE 4

| Primary sintering temperature (°C.) | Secondary heating temperature and time (°C. × hr.) | V lmA/mm (V) | Leakage current (μA) | $\alpha_1$ ($10^{-6}$-$10^{-4}$ A) | $\alpha_2$ ($10^{-4}$-$10^{-2}$ A) | Cap. (pF) |
|---|---|---|---|---|---|---|
| 1350 | 1000 × 1 | 590 | 0.40 | 13.3 | 48.8 | 195 |
| 1350 | 1100 × 1 | 450 | 0.95 | 8.1 | 31.7 | 255 |
| 1350 | 1200 × 1 | 330 | 1.32 | 6.5 | 24.5 | 320 |

The following is a brief review of the above examples. In Examples 1 to 3, the process was conducted at different primary sintering temperatures ranging from 1200° C. to 1350° C. It can be seen that the higher the primary sintering temperature the lower the breakdown voltage regardless of the kind of paste used. This is because the higher the primary sintering temperature, the faster is the speed of grain growth, and the larger is the diameter of the grain. In addition, it can be seen that when the matter is sintered primarily at 1300° C., it not only exhibits a lower leakage current, but also the highest non-linear voltage-current characteristic.

In Example 4 the primary sintering temperature is 1350° C. and the secondary heating temperature is changed respectively to 1000° C., 1100° C., and 1200° C. The best results are exhibited when the secondary heating step is carried out at 1000° C. The characteristics of the varistor are largely changed in response to the conditions of the secondary heating step. This is particularly the case where comparing the voltage-current characteristics exhibited by the primarily sintered body and the test piece that was subjected to the secondary heating step in FIG. 2.

In conclusion, a primary sintered body lacking bismuth oxide, will exhibit a voltage-current characteristic that is almost linear. On the contrary, in the case where the paste comprises $Bi_2O_3$ as a major ingredient, and printing and a secondary heating step are carried out to diffuse bismuth oxide to the zinc oxide grain boundaries, a remarkably non-linear voltage-current characteristic curve is exhibited by the varistor. Thus, it can be appreciated that a potential barrier is only formed when bismuth oxide is present in the vicinity of the zinc oxide grain boundaries, and that this potential barrier controls the voltage-current characteristics of the zinc oxide varistor.

What is claimed is:

1. A method for fabricating the high voltage zinc oxide varistor having a high breakdown voltage and good voltage-current characteristics comprising;

preparing a zinc oxide mixture comprising zinc oxide and a further oxide selected from the group consisting of antimony oxide, cobalt oxide, manganese oxide, chromium oxide, and mixtures thereof;

sintering the zinc oxide mixture at a temperature of 1200 to 1350° C. under conditions and for a period of time effective to form a primary sintered varistor body;

coating the surface of the primary sintered varistor body with a metal oxide past comprising bismuth oxide as a major ingredient and a second ingredient selected from the group consisting of $B_2O_3$, zinc oxide or mixtures thereof in an amount effective to form a coated primary sintered varistor body; and heat treating the coated primary sintered varistor body at a temperature of 1000 to 1200° C. under conditions and for a period of time effective to print the metal oxide paste on the surface of the primary sintered body and diffuse the bismuth oxide to the grain boundaries of the zinc oxide in the sintered varistor body to obtain said high voltage zinc oxide varistor.

2. The method of claim 1, wherein
   the sintering step is conducted at a temperature of 1200° C.

3. The method of claim 1, wherein
   the sintering step is conducted at a temperature of 1250° C.

4. The method of claim 1, wherein
   the sintering step is conducted at a temperature of up to 1300° C.

5. The method of claim 1, wherein
   the sintering step is conducted at a temperature of 1350° C.

6. The method of claim 1, wherein
   the heat treating step is conducted at a temperature of 1000 to 1200° .

7. The method of claim 6, wherein
   the heat treating step is conducted at a temperature of 1000° C.

8. The method of claim 6, wherein
   the heat treating step is conducted at a temperature of 1100° C.

9. The method of claim 7, wherein
   the heat treating step is conducted at a temperature of 1200° C.

* * * * *